United States Patent [19]

Westerman, Jr.

[11] Patent Number: 4,916,880
[45] Date of Patent: Apr. 17, 1990

[54] APPARATUS FOR REPAIRING A HOLE IN A STRUCTURAL WALL OF COMPOSITE MATERIAL

[75] Inventor: Everett A. Westerman, Jr., Auburn, Wash.

[73] Assignee: The Boeing Company, Seattle, Wash.

[21] Appl. No.: 165,938

[22] Filed: Feb. 18, 1988

Related U.S. Application Data

[62] Division of Ser. No. 889,118, Jul. 21, 1986.

[51] Int. Cl.[4] ............................................. B32B 35/00
[52] U.S. Cl. ................................. 52/514; 29/402.09; 156/94; 264/36; 428/63
[58] Field of Search .............. 52/514; 264/36; 428/63; 156/94; 29/402.09

[56] References Cited

U.S. PATENT DOCUMENTS

| 379,510 | 3/1888 | Eynon . | |
|---|---|---|---|
| 1,569,490 | 1/1926 | Hiscock . | |
| 2,198,167 | 4/1940 | Harman | 29/148 |
| 2,217,311 | 10/1940 | Goss | 52/514 |
| 2,229,878 | 1/1941 | Wilson | 154/14 |
| 2,278,334 | 3/1942 | Scott | 189/36 |
| 2,415,905 | 2/1947 | Overton | 189/36 |
| 2,506,233 | 5/1950 | Murphy | 189/36 |
| 2,786,264 | 3/1957 | Colombo | 29/401 |
| 3,101,764 | 8/1963 | Gruber | 152/367 |
| 3,215,243 | 11/1965 | Dickerson | 52/514 X |
| 3,251,721 | 5/1966 | Johnson | 156/97 |
| 3,365,097 | 1/1968 | Chase | 52/514 |
| 4,152,877 | 5/1979 | Green | 52/514 |
| 4,311,656 | 1/1982 | Spriggs | 264/36 |
| 4,486,999 | 12/1984 | Bayne | 52/514 X |
| 4,517,038 | 5/1985 | Miller | 156/98 |
| 4,554,036 | 11/1985 | Newsom | 156/94 |
| 4,560,428 | 12/1985 | Sherrick et al. | 156/94 |
| 4,620,407 | 11/1986 | Schmid | 52/741 |
| 4,732,633 | 3/1988 | Pokormy | 264/36 X |

FOREIGN PATENT DOCUMENTS

| 1109869 | 6/1961 | Fed. Rep. of Germany . | |
|---|---|---|---|
| 72698 | 4/1960 | France . | |
| 642602 | 4/1950 | United Kingdom | 52/514 |
| 639867 | 7/1950 | United Kingdom | 52/514 |
| 735758 | 9/1955 | United Kingdom | 52/514 |
| 1171582 | 11/1969 | United Kingdom . | |
| 1381276 | 1/1975 | United Kingdom . | |

Primary Examiner—David A. Scherbel
Assistant Examiner—Lan Mai
Attorney, Agent, or Firm—Delbert J. Barnard

[57] ABSTRACT

A hole (12) in a panel (10) of composite material is cut by a router or the like to dress it into a rounded hole (12'). A cavity is routed or otherwise formed in the panel (10) to extend across the dressed hole (12') in the direction of maximum tension loads in the panel (10). An insert (16) is secured in the cavity (18). The insert (16) and the cavity (18) have matching plan forms and each has a relatively narrow central portion and enlarged end portions (42, 44). The end portions (42, 44) of the insert interlock with end portions of the cavity (18) such that tension loads will be carried by the insert (16) from a region of the wall (10) on one side of the hole (12') across the hole (12') to a region of the wall (10) on the opposite side of the hole (12').

23 Claims, 5 Drawing Sheets

APPARATUS FOR REPAIRING A HOLE IN A STRUCTURAL WALL OF COMPOSITE MATERIAL

This application is a division, of application Ser. No. 889,118, filed July 21, 1986 now pending.

DESCRIPTION

1. Technical Field

The present invention relates to the repair of a hole in a panel of composite material and, in particular, to the provision of a repair method and apparatus which implants a load carrying insert in the material, spanning across the hole, for transmitting loads across the hole, including tension loads.

2. Background Information

It is known to construct structural panels from a composite material comprising layers of a structural fiber (e.g. graphite fibers) within a matrix. The use of such composite material for making an aircraft panel structure is discussed in U.S. Pat. No. 4,463,044, granted July 31, 1984 to Maurice McKinney.

In use, damage type holes can be formed in the panel material. The standard way of repairing such holes is to form a tapered recess in the composite material around the hole. Disk-shaped layers of structural fiber cloth, of different diameters, are set into the recess. The fibers of each layer are oriented at a different angle to the fibers of the adjoining layer. The layers are secured in place by the use of high strength adhesives. A problem with these adhesives is that they require a long cure time. Also, this method of repair requires a highly trained technician and the repaired area relies totally on the adhesives to transfer the design load across the repair. A similar technique is disclosed by U.S. Pat. No. 4,554,036, granted Nov. 19, 1985, to Cosby M. Newsom. Other repair techniques, known in the patent literature, are disclosed by U.S. Pat. No. 4,517,038, granted May 14, 1985 to Robert W. Miller, and U.S. Pat. No. 4,560,428, granted Dec. 24, 1985 to George O. Sherrick and Joseph R. Rosenthal.

3. Disclosure of the Invention

The repair method of the present invention is basically characterized by the following steps. An insert is constructed from a material which is capable of carrying tension loads. The insert is dimensioned to span across the hole in the region to be repaired and to extend a substantial distance beyond the hole on at least two opposite sides of the hole. The insert has a relatively narrow central portion and substantially wider end portions. A cavity sized and shaped to snugly receive the insert is formed in the wall. The cavity is positioned so that the relatively narrow central portion of the insert will span across the hole and the wider end portions of the insert will be embedded into the wall material on opposite sides of the hole in a direction coinciding with the direction of tension loads in the wall. As a result, the end portions of the insert will interlock with the end portions of the cavity in the wall and tension loads will be carried by the insert from a region of the wall on one side of the hole, across the hole, to a region of the wall on the opposite side of the hole. The insert is placed into the cavity and is secured in place in the cavity.

In accordance to an aspect of the invention, the insert is in the form of a plurality of members, identical in plan form. The cavity is formed to have a depth capable of receiving the plurality of members. The plurality of members are placed into the cavity and are secured in place in the cavity. An advantage of constructing the insert from a plurality of members is that they may be more readily bent and this facilitates using the structural repair method of the present invention to repair a hole in a slightly curved surface.

The insert member or members may be secured in place by the use of an adhesive. The adhesive need not carry the design loads across the repaired region. As a result, readily available, inexpensive, fast curing low strength adhesives may be used.

In preferred form, an insert is used which has an elongated bar-shaped central portion with substantially parallel side edges, and substantially identical end portions. Each end portion includes inner edge surfaces which intersect and extend gradually perpendicular to the side surfaces of the central portion of the insert. The cavity includes complementary edge surfaces which in use make tension load transferring contact with the inner edge surfaces of the end portions of the insert.

A particularly advantageous insert has end portions having outer edge surfaces which form a V and function to divide the stresses in the wall so that they will extend substantially evenly around both sides of the end portion of the insert and no stress concentration is formed in the wall endwise of the insert.

Other features of the invention, and advantages associated with such features, are hereinafter discussed as a part of the description of the illustrated embodiments.

BRIEF DESCRIPTION OF THE DRAWING

Like reference numerals are used to designate like parts throughout the several views of the drawings, and.

BEST MODE FOR CARRYING OUT THE INVENTION

A composite panel is constructed of layers of fabric held together by a resin. The fibers of each cloth layer or ply are usually oreinted to extend in a different direction from the fibers of the adjacent ply. This arrangement and typical composite materials are disclosed in the aforementioned U.S. Pat. No. 4,463,044.

Figure 1:
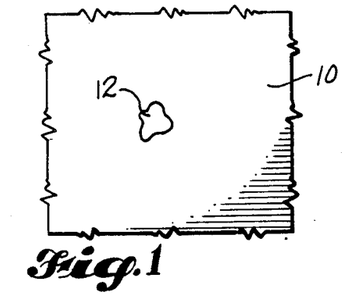
FIG. 1 is a fragmentary plan view of a wing surface or the like constructed from a composite material, showing a damaged area in the form of an opening in the material.

When a panel region 10 of an aircraft is damaged, such as by an object passing through it, a hole 12 is produced which is initially irregular in shape, as shown by FIG. 1. A first step in the repair of a hole 12 is to dress the hole to give it a smoothly curving border, e.g. making it round. This step alone improves the stress pattern in the material surrounding the hole.

Figure 2:
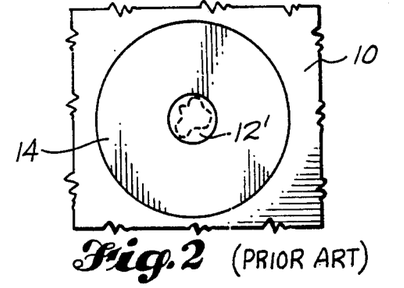
FIG. 2 is a view like FIG. 1, showing the hole dressed to give it a round shape, and showing a tapered recess formed in the material surrounding the hole, to prepare the damaged region for the receipt of a prior art type patch.
Figures 3, 4:
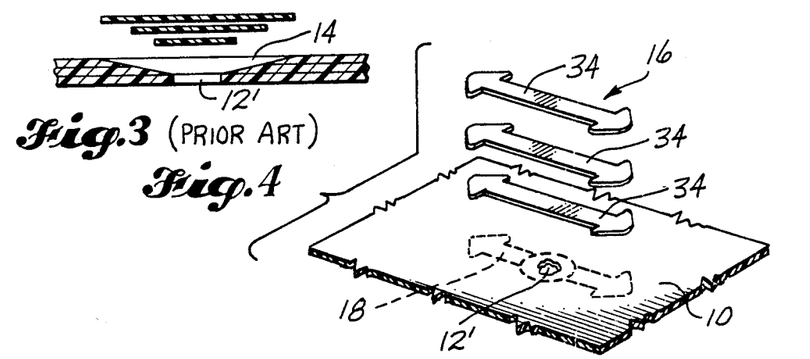
FIG. 3 is a sectional view taken substantial along line 3—3 of FIG. 2, showing the nature of the tapered recess and further showing a poly oriented prepreg-type patch in spaced relationship from the recess.
FIG. 4 is an exploded isometric view showing the component parts of the repair system of the present invention spaced out from the damaged region in the wall of composite material, and showing in broken line the pattern of the hole after it has been dressed and the pattern of an insert receiving recess that is formed in the wall material by use of a router.

FIGS. 2 and 3 show the above described standard way of repairing a hole in a panel of composite material. The tapered recess 14 is formed around the dressed opening 14' on the outer side of the panel 10. Layers of structural fabric material of different diameters are set into the recess 14, with the fibers of each layer being oriented at a different angle to the fibers of the adjoining layer. The layers are secured in place by the use of high strength adhesives or resins.

The repair process of the present invention starts with the step of dressing the initially irregular opening 12 to give it a smoothly curving border. FIG. 4 shows the initial hole 12 surrounded by a broken line pattern of a dressed round hole 12'.

Next, an insert is selected. The insert must be constructed from a material that is capable of carrying the design loads. The insert must be dimensioned to span across the hole 12' and extend a substantial distance beyond the hole 12' on at least two opposite sides of the hole. The insert must have a relatively narrow central portion and substantially wider end portions. As will hereinafter be described, the insert 16 may be a single member or a plurality of members.

A cavity conforming in plan shape to the plan shape of the insert is formed in the panel 10. This cavity includes a relatively narrow central portion and substantially wider end portions. The central portion is formed to extend across the hole 12' and the end portions are spaced outwardly from the hole 12', on diametrically opposite sides of the hole 12'.

A router may be used for dressing the opening 12 to form the dressed opening 12', and for forming the cavity. By way of example, U.S. Pat. No. 1,569,490, granted Jan. 12, 1926, to Joseph H. Hiscock discloses a router and technology for making a templet for use with the router to form almost any shape of recess that is desired. Of course, there are other routers and other templets available which may also be used for dressing the hole 12 and forming the insert receiving cavity.

Figures 6, 7:
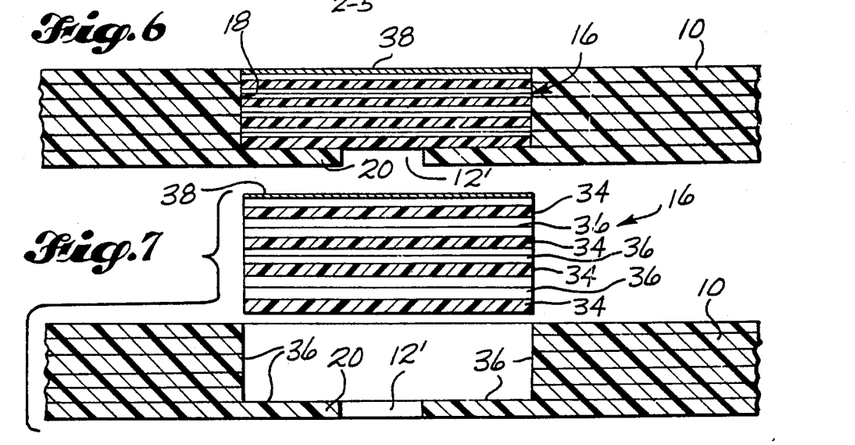
FIG. 6 is a sectional view taken substantially along line 6—6 of FIG. 5, showing the sectional construction of the repairs.
FIG. 7 is a view like FIG. 6, but with the repair components spaced out from the recess in the wall material.
Figure 12:
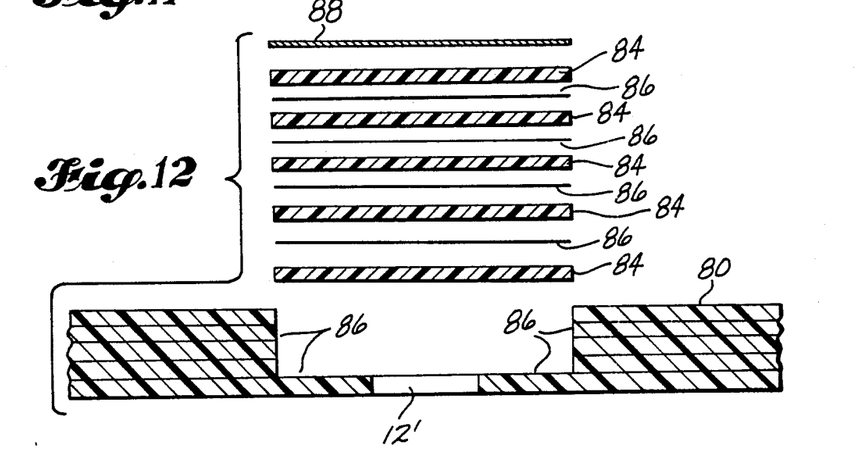
FIG. 12 is a view like FIG. 7, but of the repair patch shown by FIG. 11.

As shown by FIGS. 6, 7 and 12, the cavity may be in the nature of a recess 18 formed in the composite panel 10. The formation of a cavity 18 which does not extend all the way through the panel 10 (i.e. a recess) results in the formation of a support shelf 20 on which the insert 16 is supported.

Figure 9:
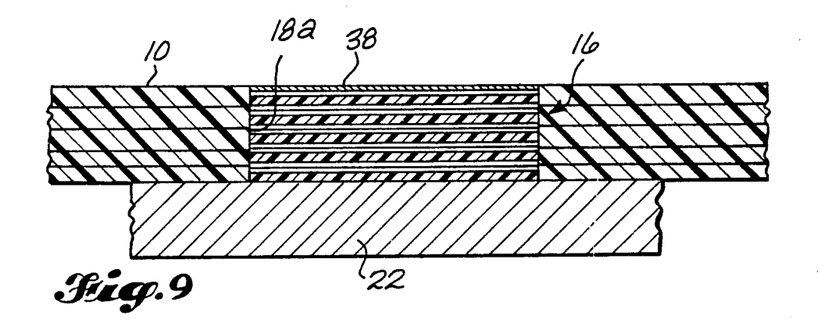
FIG. 9 is a view like FIG. 6, but of a repaired region in which the wall is backed-up by a structural member, such view showing an opening for the splices cut all the way through the wall and the structural member providing rear support for the repair components.

In a region in which the panel 10 is backed up by a structural member 22, the cavity 18a can be formed to extend all of the way through the panel 10 and the structural member 22 will function as the support for the insert 16 (FIG. 9).

Figure 10:
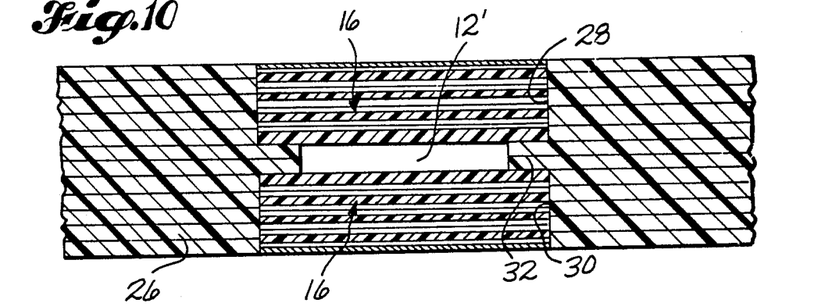
FIG. 10 is a view like FIGS. 6 and 9, but of a wall which has been repaired on each of its sides.

In some installations it may be desirable to implant an insert into each side of the panel. Such an arrangement is shown by FIG. 10 in which the panel is designated 26. In this situation a recess may be formed in each side of the panel 26. These recesses 28, 30 are of such a depth that a shelf of material 32 is defined between the two recesses 28, 30, to serve as a support for both of the inserts 16.

Figure 5:
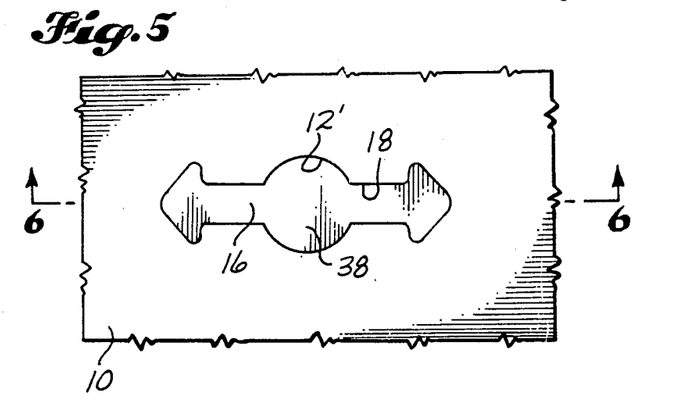
FIG. 5 is a plan view of a damaged region following its repair.

In preferred form, the insert 16 comprises a plurality of members 34 which are stacked together in the cavity. An advantage of this arrangement is that the individual members 34 can bend easier than a solid member, allowing the process to be used for putting a tension transferring insert into a curved surface without any sacrafice in strength. A plurality of thin members 34 can carry the same load as a single member insert of the same thickness. FIGS. 5-7 show the make up of a basic repair made by use of the present invention. A suitable adhesive is applied on the bottom and sidewalls of the cavity 18 and between the members 34. A filler material 38 is provided outwardly of the insert 16, and in the region of the hole 12' on opposite sides of the insert 16, to fill such regions of the hole 12' and to make the outer surface of the repaired region flush with the surface of panel 10 surrounding the repaired region, to maintain overall surface smoothness. FIG. 5 is a plan view of the repaired region. In this view the outline of the dressed hole 12' and the insert receiving recess 18 are shown, but in an actual repair the outline shown would probably not be visible, particularly if the surface is painted after being repaired.

Figure 8:
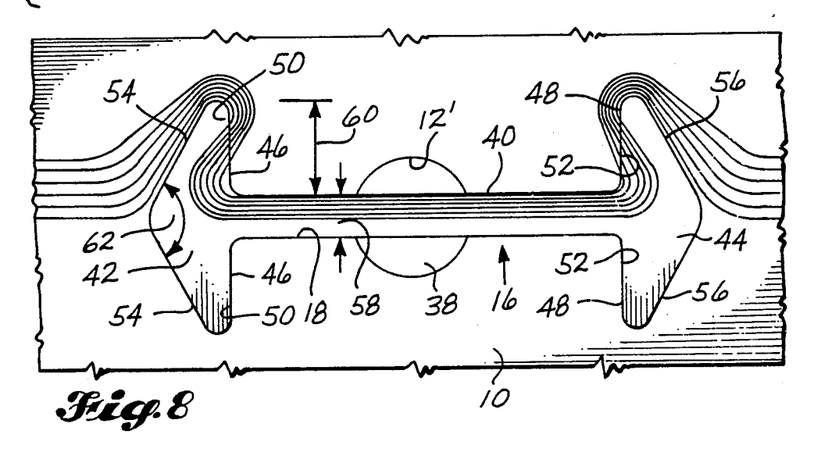
FIG. 8 is a plan view of the repair, showing the insert functioning to transfer stresses across the hole.

FIG. 8 shows a preferred configuration of the insert 16. It comprises a relatively long and narrow central portion 40 and a pair of end portions 42, 44. The central portion 40 is bar-shaped and has substantially parallel side edges. Each end portio 42, 44 includes inner edge surfaces 46, 48 which intersect and extend generally perpendicular to the side surface of the central portion 40. The cavity 18 includes complementary edge surfaces 50, 52 which in use make tension load transferring contact with the inner edge surfaces 46, 48 of the end portions 42, 44 of the insert 16. In preferred form, the end portions 42, 44 of the insert 16 include outer edge surfaces 54, 56 which form a V and function to divide the stresses in the panel 10 so that when the panel 10 is in tension the stresses will extend substantially evenly around both sides of the insert and there will be no substantial stress concentration in the wall endwise of the insert. The stress pattern that is produced is shown in FIG. 8.

Important design considerations are to make the hole 12' as small as possible and to make the insert 16 as small as possible, while still providing enough width at 58, and enough edge contact at 60, and a sufficient thickness of the insert 16, to enable the insert 16 to carry the loading imposed upon it across the hole 12'. As will be evident, if the size of the insert 16 is controlled, any increase of width of the insert 16 at 58 will decrease the amount of edge contact at 60. Likewise, any increase in the edge contact 60 will decrease the width at 58. A design consideration is to select the dimensions 58, 60 to provide the best balance possible.

As illustrated, the three corners of each end portion 42, 44, and the intersection corners where the end portions meet the central portions, are to be rounded, for the purpose of facilitating stress transfer around these corners. It is preferred that the angle 62 be in the range of 110° to 140°.

Figure 11:
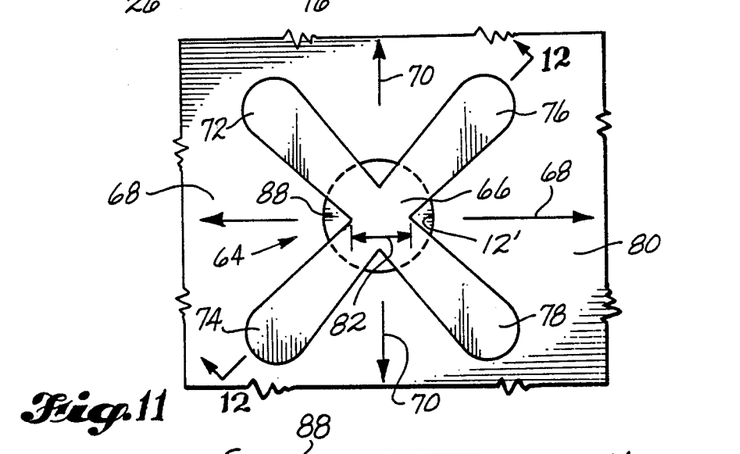
FIG. 11 is a plan view of a region of a wall which in use must carry tension in two directions, showing a modified form of the load carrying splice members, and its relationship to the damaged region.

FIGS. 11 and 12 show a second form of insert. This insert 64 has a relatively narrow central portion 66 and enlarged end portions in each of two directions. As is apparent, the insert 64 is generally in the shape of a X formed by elongated bar members which cross at their centers. The insert 64 has either one or two orientation axes, depending whether the panel 80 is in tension in one direction only, or in two directions, as illustrated in FIG. 11. Each orientation axes bisects spaces between leg portions of the elongated bar members, at opposite ends of the insert 64. In FIG. 11 the leg portions are designated 72, 74, 76, 78. Arrows 68 denote tension acting in a first direction. Arrows 70 denote tension acting in a second direction that is perpendicular to the arrows 68. In the direction of arrows 68, the first end portion is defined by bars 72, 74. The second end portion is defined by bars 76, 78. In the direction of tension indicated by arrows 70, the first end portion is defined by bar leg portions 72, 76 and the second end portion is defined by bar leg portions 74, 78.

In design of insert 64, the dimension 82 is made substantial enough that it will carry the tension loads that are present across the dressed opening 12'. As illustrated, the outer ends of the leg members are rounded for the purpose of reducing stress concentrations in the material adjoining these ends. In preferred form, each leg member 72, 74, 76, 78, and the portion of the cavity in which it is situated, increase in width as they extend outwardly from the center of the insert 64 and the cavity 82. This prevents endwise movement of the leg portions in their regions of the cavity 82, in response to the insert 64 being put into tension along an orientation axis (either along lines 68 or along lines 70).

As before, the insert 64 may comprise a plurality or stack of members 84. A layer of adhesive 86 is applied to the surfaces of the recess 82 and layers of adhesive 86 are provided between the members 84. A filler layer 88 is provided in the recess 82, outwardly of the insert 64, to provide the panel 80 with a continuous smooth surface extending across the repaired region.

FIGS. 13–16 relate to a third embodiment of the invention. This embodiment is shown in the form of a variation of the embodiment shown by FIGS. 4–8. The difference is that there is a difference in the depth of the insert and the apparatus includes an overlay patch 90.

Figure 13:
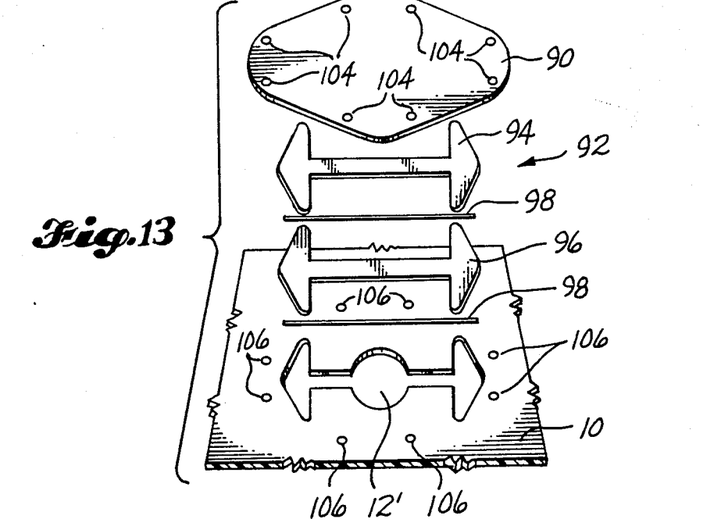
FIG. 13 is an exploded isometric view of the components of yet another embodiment of the invention, shown spaced from the damaged region in a wall of composite material.

As before, the hole 12 is dressed to form a dressed hole 12'. A cavity 18 is routed or otherwise formed in the panel 11 and is oriented, as before, to extend across the hole 12'. An insert 92, shown in the form of a pair of members 94, 96 is secured in the recess 18, including the use of adhesive layers 98. In this embodiment the recess 18 has a depth smaller than the thickness of the insert 92, so that when the insert 92 is located within the recess 18, a portion of it will project outwardly beyond the outer surface 100 of the panel 11. The overlay patch 90 is both longer and wider than the insert 92. The inner surface of the overlay patch 90 is formed to include a recess 102 conforming in plan form to the plan form of the insert 92. This recess is substantially equal in depth to the distance that the insert 92 projects outwardly beyond the surface 100.

Figure 14:
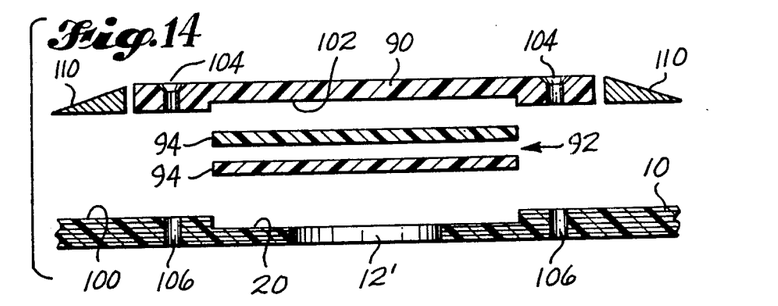
FIG. 14 is an exploded sectional view of the components from FIG. 13.
Figure 15:
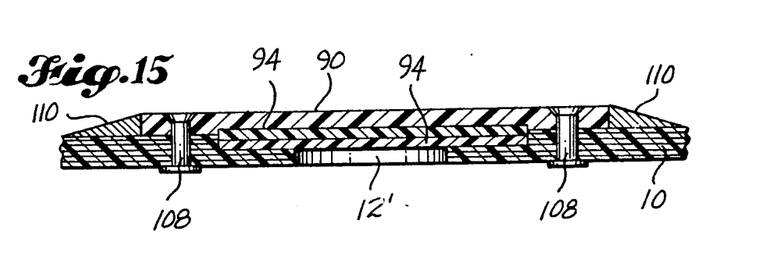
FIG. 15 is a sectional view through the damaged region of FIG. 13 following its repair, showing the repair components in an assembled condition.

As shown by FIGS. 14 and 15, the overlay patch 90 is placed over the insert, with the recess 102 is in registry with the insert 92. The overlay patch is in a suitable manner secured to the panel 10. Preferably, patch 90 is provided with a plurality of fastener receiving openings 104. Matching openings 106 are provided in the panel 10. Rivets 108 or some other suitable mechanical fastener element is inserted through the aligned openings 104, 106, and used to secure the overlay patch 90 to the panel 10. Following connection of overlay patch 90 to the panel 10, a suitable filler material 110 is applied to the region surrounding the overlay patch 90. This material 110 is molded or shaped to make a smooth sloping transition between the outer surface of the overlay patch 90 and the outer surface of the panel 10.

Figure 16:
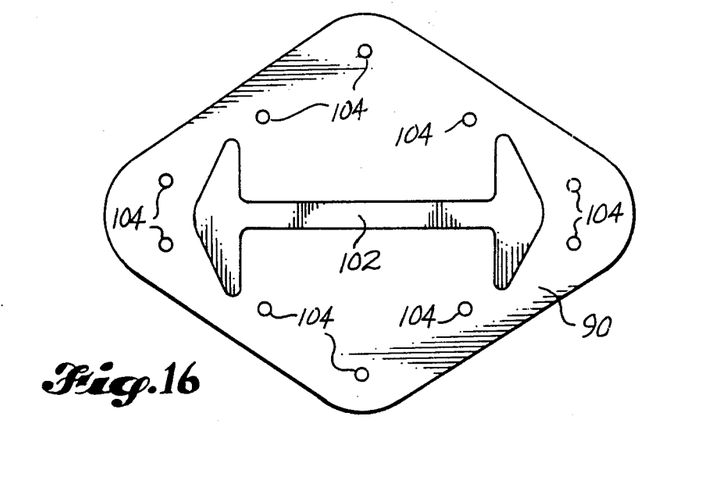
FIG. 16 is a bottom plan view of the overlay patch shown in FIGS. 13-15, said view being taken substantially alone line 16—16 of FIG. 14.

FIG. 16 is a plan view of the overlay patch 90, looking into the recess 102. This view shows a typical size of the overlay patch 90, and a typical size relationship of the overlay patch 90 to the insert 92, and shows a typical pattern of the fasteners used to secure the overlay patch 90 to the panel 10.

Figure 17:
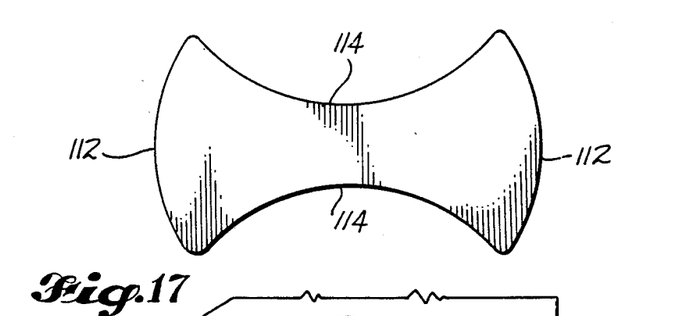
FIG. 17 is a plan view of a third form of insert.

FIG. 17 is a plan view of yet aother form of insert. This insert is a center strip segment of a circle. Regions 112 have circular curvature. These regions are opposite each other and their curvature is convex. Regions 114 are also of circular curvature. These regions are opposite each other and they are concave. As the other embodiments, this form of insert has a relatively narrow central portion and enlarged size end portions.

As previously stated, it is desirable to use as small an insert as possible. The size of the opening to be repaired to a considerable extent determines the size of the insert. The opening must first be rounded, i.e. dressed, and the cavity must be formed to receive the insert. This cutting further disturbs the material. That is why it is desirable to use as small of an insert as possible. The smaller the insert the smaller of the amount of disturbance to the material.

As also previously stated, in the design of the insert, it is necessary to provide the end pieces with a significant amount of load bearing surface (end surfaces 46, 48 in FIG. 8). It is also necessary to provide the center portion 40 with enough section at 58 so that it can carry a substantial tension load. The insert 16 is made as small as possible. The tension transferring surfaces 46, 48 are made as large as possible without a detrimental sacraficing of the load carrying capability of the central portion 40. A way of restating this last statement is that the central load carrying portion 40 is provided with as large a section at 58 as possible without sacrificing the tension load transferring capability of the end portions 42, 44 of the insert 16.

The inserts can be made out of a number of different materials. Titanium is preferred because it is a very strong material for its size and weight. Composite laminate inserts may be used. Aluminum is not a good choice because aluminum, in combination with graphite epoxy composite material, corrodes quite rapidly.

The insert can be secured in place within the cavity in any suitable manner. Preferably, an adhesive is used. The adhesive need not carry a load. Thus, there are a number of quick drying, inexpensive adhesives available which can be used. An adhesive is not necessary if an overlay is used. It may also be possible to secure the insert in place by a tight fit alone.

Typically, the tension loads in an aircraft surface panel is about 10,000 pounds force in one direction and about 300 pounds force in the transverse direction. An insert of the type shown by FIG. 8 can be used in such a panel. The length direction of the insert would be aligned with the direction of maximum tension.

Figure 18:
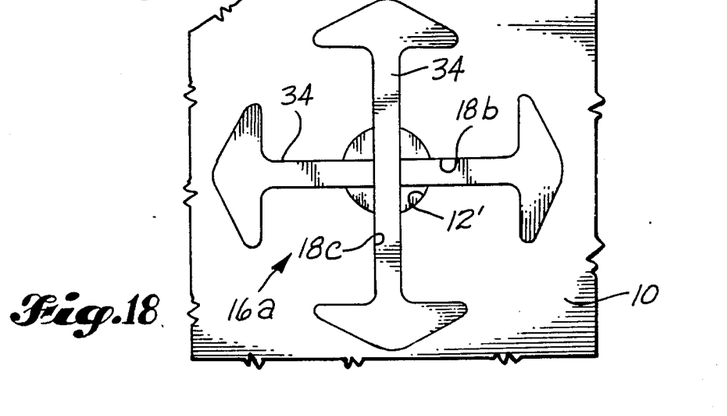
FIG. 18 is a view like FIG. 17 of a biaxial use of the insert shown by FIGS. 1-9 and 13-19.

As shown by FIG. 18, crossing recess 18b, 18c, may be formed in the panel 10. Then, the insert member 34 may be placed in the recesses in an alternating manner. In other words, a first insert member 34 may be set in recess 18b, the second in recess 18c, the third in recess 18b, etc. until the insert 16' is completed. This type of insert can carry biaxial loads.

Another use for the method and apparatus of the present invention is to splice together two separate structural members. It is believed that the X-shaped insert is particularly suited for making a splice joint. The X-shaped insert (FIG. 11) can take a substantial amount of shear forces across the center of the patch.

In accordance with established rules of patent interpretation, the foregoing description sets forth a plurality of examples of the invention but does not define the invention. Rather, the invention is defined by the following claims.

What is claimed is:

1. For use in the repair of a tension carrying wall of composite material which has been damaged by the formation of a hole in the wall, said composite material comprising layers of structural fibers within a matrix, a load carrying insert having end portions which in use are situated on opposite sides of the hole along a line which extends in the direction of tension loads in said wall, a central portion which is substantially narrower than the end portions, and tension load transfering edge portions, so that a cavity conforming in size and shape to the insert can be formed in the wall, to span across the opening in the direction of tension loads in said wall, and the insert can be positioned in the cavity and secured in place, to interlock with the cavity and transmit tension loads across the hole.

2. An insert according to claim 1, said central portion of the insert being bar shaped and having substantially parallel side edges, and said end portions each having a tension load transferring inner edge surface on each side of the central portion which extends substantially perpendicular to the side edge of said central portion.

3. An insert according to claim 2, wherein each end portion of the insert has a plan form generally in the shape of an isosceles triangle, with the inner edges of each end portion forming the base of the triangle, and with the outer portion of the triangle being shaped to substantially eliminate stress concentrations in the wall outwardly of the ends of thhe insert.

4. For use in the repair of a tension carrying wall of composite material which has been damaged by the formation of a hole in the wall, said composite material comprising layers of structural fibers within a matrix;
 a load carrying insert having end portions which in use are situated on opposite sides of the hole along a line which extends in the direction of tension loads in said wall, and a central portion which is substantially narrower than the end portions, said end portions having tension load transfering edges, so that a cavity conforming in size and shape to the insert can be formed in the wall, to span across the opening in the direction of tension loads in said wall, and the insert can be positioned in said cavity and secured in place, to interlock with edges of the cavity and transmit tension loads across the hole;
 an overlay patch of a load carrying metal having an inner surface, a recess in said inner surface corresponding in plan form to the insert, so that the overlay patch can be placed over the insert, with an outer portion of the insert situated within said recess, said overlay patch including a border portion generally encircling the recess, and fastener receiving openings in said border portion, spaced about the recess; and
 mechanical fastener means extendible through said opening, for securing the overlay patch to the wall.

5. The repair system of claim 4, in which the central portion of the insert is bar-shaped and has substantially parallel side edges, and said end portions each have a tension load transfering inner edge surface on each side of the central portion which extends substantially perpendicular to the side edges of the central portion.

6. The repair system of claim 5, wherein each end portion of the insert has a plan form generally in the shape of an isoceles triangle, with the inner edges of each end portion forming the base of the triangle, and with the outer portion of the triangle being shaped to substantially eliminate stress concentrations in the wall outwardly of the end of the insert.

7. The repair system of claim 4, wherein the insert comprises a plurality of members of identical plan form which in use are stacked together in the cavity.

8. In combination with a structural wall of composite material, said composite material comprising layers of structural fibers within a matrix, which has been damaged by the formation of a hole in the region of the wall which must in use carry tension loads, a repair system comprising:
 an insert constructed from a material which is capable of carrying tension loads, and which is dimensioned to span across the hole and extend a substantial distance beyond the hole on at least two opposite sides of the hole, said insert having a relatively narrow central portion and substantially wider end portions;
 a cavity formed in the wall which is sized and shaped to snugly receive said insert, said cavity being positioned so that the relatively narrow central portion of the insert will span across the hole in the wall and the substantially wider end portions of the insert will be embedded into the wall on opposite sides of the hole in a direction coinciding with the direction of tension loads in the wall, so that the end portions of the insert will interlock with end portions of the cavity in the wall and tension loads will be carried by the insert from a region of the wall on one side of the hole, across the hole, to a region of the wall on the opposite side of the hole; and means for securing the insert in the cavity.

9. The combination of claim 8, wherein the insert is in the form of a plurality of members identical in plan form, and the cavity has a depth capable of receiving said plurality of members stacked together.

10. The combination of claim 8 in which the means securing the insert in the cavity comprises an adhesive.

11. The combination of claim 9, wherein the means for securing the insert in the cavity includes an adhesive for securing the insert members together, and such members in the cavity.

12. The combination of claim 8, wherein the cavity is of such a depth that when the insert is secured in the cavity an outer surface of the insert is presented which is inset from a flush position with the surface of the wall surrounding the hole and the insert, said combination further including a filler material in said hole and in the cavity region outwardly out of the outer surface of the insert, providing an outer surface in the region of the hole and the insert which is substantially flush with the surrounding surface of the wall.

13. The combination of claim 8, wherein the cavity includes a support shelf at its base, for supporting the insert.

14. The combination of claim 8, further comprising a second cavity of the type described, with one cavity being on one side of the wall and the other cavity being on the opposite side of the wall, and a support lip being defined between the two cavities, and a second insert of the type described in the second cavity, and means for securing the second insert into its cavity.

15. The combination of claim 8, wherein the insert has an elongated bar-shaped central portion with substantially parallel side edges, and substantially identical end portions, each said end portion including inner edge surfaces which intersect and extend generally perpendicular to the side surfaces of the central portion of the insert, and said cavity including complementary edge surfaces which in use make tension load-transfering contact with the inner edge surfaces of the end portions of the insert.

16. The combination of claim 8, wherein each end portion of the insert includes outer end edge surfaces which form a V and are positioned to divide the stresses in the wall so that the stresses extend substantially evenly around both sides of the end portion of the insert without a stress concentration in the wall endwise of the insert.

17. The combination of claim 8, wherein the insert is generally in the shape of an X formed by elongated bar members which cross at their centers, said insert having an orientation axis which is generally aligned with the direction of tension loads in the walls, said orientation axis bisecting spaces between leg portions of the elongated bar members, at opposite ends of the insert.

18. The combination of claim 17, wherein the leg members increase in width as they extend outwardly from the center of the insert, so that endwise movement of the leg portions in their regions of the cavity, in response to the insert being put in tension along the orientation axis, will be resisted by contact between the side edges of the leg portions and the side edges of their regions of the cavity.

19. The combination of claim 8, further comprising an overlay patch which is both longer and wider than the insert, said overlay patch having an inner surface in which a recess is formed, said recess conforming in plan form to the plan form of the insert, said overlay patch including a portion substantially surrounding the recess, said overlay patch being positioned over the insert, with the recess in the overlay patch positioned to receive an outwardly projecting portion of the insert, and means for securing the overlay patch to the wall.

20. The combination of claim 19, comprising a plurality of mechanical fasteners extending through the overlay patch and the wall, said mechanical fasteners being spaced apart in a pattern in which they generally encircle the insert.

21. The combination of claim 20, wherein the insert comprises a plurality of members of the type described, stacked together in said cavity, with the outer most member projecting outwardly beyond the outer surface of the wall, into the recess in the overlay patch.

22. The combination of claim 21, further comprising a filler material in the region surrounding the overlay patch, said filler material making a smooth sloping transition between the outer surface of the overlay patch and the wall.

23. The insert of claim 1, wherein the insert comprises a plurality of members of identical plan form which in use are stacked together in the cavity.

* * * * *

UNITED STATES PATENT AND TRADEMARK OFFICE
CERTIFICATE OF CORRECTION

PATENT NO. : 4,916,880

DATED : April 17, 1990

INVENTOR(S) : Everett A. Westerman, Jr.

It is certified that error appears in the above-identified patent and that said Letters Patent is hereby corrected as shown below:

Col. 1, line 62, "resion" should be -- region --.

Col. 2, line 17, "gradually" should be -- generally --.

Col. 2, line 47, "poly" should be -- ply as --.

Col. 3, line 31, "oreinted" should be -- oriented --.

Col. 3, line 45, "14'" should be -- 12' --.

Col. 4, line 59, "portio" should be -- portion --.

Col. 6, line 38, "aother" should be -- another --.

Claim 3, col. 7, line 66, "thhe" should be -- the --.

Signed and Sealed this

Seventeenth Day of December, 1991

Attest:

HARRY F. MANBECK, JR.

Attesting Officer

Commissioner of Patents and Trademarks